（12) United States Patent
Kim

(10) Patent No.: US 10,450,864 B2
(45) Date of Patent: Oct. 22, 2019

(54) GAS TURBINE COOLING APPARATUS

(71) Applicant: DOOSAN HEAVY INDUSTRIES CONSTRUCTION CO., LTD., Gyeongsangnam-do (KR)

(72) Inventor: Kyung Kook Kim, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 385 days.

(21) Appl. No.: 15/293,618

(22) Filed: Oct. 14, 2016

(65) Prior Publication Data
US 2017/0107822 A1   Apr. 20, 2017

(30) Foreign Application Priority Data

Oct. 15, 2015 (KR) .................. 10-2015-0143974

(51) Int. Cl.
*F01D 5/08* (2006.01)
*F01D 5/02* (2006.01)
(Continued)

(52) U.S. Cl.
CPC ............. *F01D 5/085* (2013.01); *F01D 5/026* (2013.01); *F01D 5/08* (2013.01); *F01D 25/12* (2013.01);
(Continued)

(58) Field of Classification Search
CPC . F01D 5/08; F01D 5/085; F01D 5/026; F01D 25/12; F02C 7/18
See application file for complete search history.

(56) References Cited

U.S. PATENT DOCUMENTS 7,585,148 B2 * 9/2009 Hoell ...................... F01D 5/026
                                                          415/115
9,127,693 B2 * 9/2015 Hashimoto ............. F01D 5/082
(Continued)

FOREIGN PATENT DOCUMENTS

EP       0965726 A1   12/1999
EP       1577493 A1    9/2005
(Continued)

OTHER PUBLICATIONS

Korean Office Action in Application 10-2015-0143974.
(Continued)

*Primary Examiner* — Dwayne J White
*Assistant Examiner* — Jackson N Gillenwaters
(74) *Attorney, Agent, or Firm* — Invenstone Patent, LLC

(57) ABSTRACT

Disclosed herein is a cooling apparatus of a gas turbine including a compressor disk unit mounted in a gas turbine and provided with compressor cooling passages; the torque tube units provided in an adhering state to each other while being adjacent to the compressor disk unit and provided with a cooling air supply passage communicating with the compressor disk cooling passage; and a turbine disk unit provided with a turbine disk cooling passage communicating with the cooling air supply passage of the torque tube unit, in which the torque tube units are disposed between the compressor disk unit and the turbine disk unit and coupled therewith in an adhering state to each other along an axial direction of a rotation shaft mounted in the gas turbine and the cooling air supply passage is open in horizontal direction along the axial direction from an edge of the torque tube unit.

18 Claims, 4 Drawing Sheets

(51) Int. Cl.
*F01D 25/12* (2006.01)
*F02C 7/18* (2006.01)
*F04D 29/32* (2006.01)
*F04D 29/58* (2006.01)

(52) U.S. Cl.
CPC .............. *F02C 7/18* (2013.01); *F04D 29/321* (2013.01); *F04D 29/582* (2013.01); F05D 2220/32 (2013.01); F05D 2240/61 (2013.01); F05D 2260/20 (2013.01)

(56) References Cited

U.S. PATENT DOCUMENTS

| | | |
|---|---|---|
| 2010/0166559 A1 | 7/2010 | Ahaus et al. |
| 2017/0152747 A1* | 6/2017 | Kim .................. F01D 5/081 |
| 2019/0010871 A1* | 1/2019 | Yin .................. F01D 5/081 |

FOREIGN PATENT DOCUMENTS

| | | |
|---|---|---|
| JP | 2008277725 A | 10/1996 |
| JP | 3303592 B2 | 7/2002 |
| JP | 2007529668 A | 10/2007 |
| JP | 4722120 B2 | 7/2011 |
| JP | 4834511 B2 | 12/2011 |
| KR | 101665887 B1 | 10/2016 |

OTHER PUBLICATIONS

An International Search Report dated Jan. 23, 2017 in connection with International application No. PCT/KR2016/011589.
An extended European search report issued by the European Patent Office dated Mar. 9, 2017 in connections with European patent application No. 16193958.2.

* cited by examiner

US 10,450,864 B2

GAS TURBINE COOLING APPARATUS

CROSS-REFERENCE TO RELATED APPLICATION(S)

This application claims priority to Korean Patent Application No. 10-2015-0143974, filed on Oct. 15, 2015, the disclosure of which is incorporated herein by reference in its entirety.

BACKGROUND

Exemplary embodiments of the present disclosure relate to a gas turbine, and more particularly, to a cooling apparatus of a gas turbine in which a torque tube unit is configured to be separable into a plurality of individual units and the torque tube unit is provided with a cooling air supply passage to supply cooling air required for cooling of a turbine disk unit, thereby performing cooling.

Generally, a gas turbine is a kind of motor that obtains a torque by injecting combustion gas to blades of the turbine and may be largely divided into a compressor, a combustor, and a turbine. The compressor is supplied with some of power generated from a rotation of the turbine to serve to compress introduced air at a high pressure, in which the compressed air is delivered to the combustor.

The combustor mixes the compressed air with fuel and combusts the mixture to generate a flow of high-temperature combustion gas and injects the generated high-temperature combustion gas to the turbine and allows the injected combustion gas to rotate the turbine, thereby obtaining a torque.

Here, the compressor and the turbine include a plurality of turbine disks having the blades radially coupled with an outer peripheral portion thereof. Generally, the compressor includes a larger number of turbine disks than the number of turbines. Hereinafter, the plurality of turbine disks disposed in the compressor is called a compressor section and the plurality of turbine disks disposed at the turbine side is called a turbine section.

The respective turbine disks are fastened to rotate along with the adjacent turbine disks. For example, the respective turbine disks are coupled to deliver the rotation torque between the adjacent turbine disks by using the coupling scheme called the Hirth coupling. Further, the respective turbine disks are fixed using a tie rod.

The tie rod is inserted to penetrate through centers of the respective turbine disks and may be fastened to prevent the turbine disks from moving in a shaft direction by pressure nuts fastened to both ends of the tie rod.

Meanwhile, the combustor is disposed between the compressor section and the turbine section, and therefore the compressor section and the turbine section are spaced apart from each other to form a space in which the combustor is disposed and a torque transfer member that may deliver the rotation torque generated from the turbine section to the compressor section is additionally mounted in the gas turbine.

BRIEF SUMMARY

An object of the present disclosure is to cool a turbine disk unit by forming a cooling air supply passage in a torque tube unit of a gas turbine.

Other objects and advantages of the present disclosure can be understood by the following description, and become apparent with reference to the embodiments of the present invention. Also, it is obvious to those skilled in the art to which the present disclosure pertains that the objects and advantages of the present disclosure can be realized by the apparatus and methods as claimed and combinations thereof.

In accordance with one aspect of the present invention, there is provided a cooling apparatus of a gas turbine, including: a compressor disk unit configured to be mounted in a gas turbine and provided with compressor disk cooling passages; a plurality of torque tube units configured to be provided in an adhering state to each other while being adjacent to the compressor disk unit and provided with a cooling air supply passage communicating with the compressor disk cooling passage; and a turbine disk unit configured to be provided with a turbine disk cooling passage communicating with the cooling air supply passage of the torque tube unit, in which the torque tube units are disposed between the compressor disk unit and the turbine disk unit and coupled therewith in an adhering state to each other along an axial direction of a rotation shaft mounted in the gas turbine and the cooling air supply passage is open in a horizontal direction along the axial direction from an edge of the torque tube unit.

The torque tube unit may include a first to n-th unit torque tubes that are disposed between the compressor disk unit and the turbine disk unit and the first to n-th unit torque tubes may be maintained in an assembled state therebetween by using as a medium a connection member for maintaining a coupled state therebetween at a front surface and a rear surface thereof.

The first to n-th unit torque tubes may have a T-letter section shape toward a radial outer side with respect to the rotation shaft when viewed from a side by being cut in a longitudinal direction based on the rotation shaft.

The first to n-th unit torque tubes may adhere to each other in a state in which the first to n-th unit torque tubes face each other along the axial direction of the rotation shaft and may further include chamber parts that provide a space through which cooling air is introduced between the adhered first to n-th unit torque tubes.

The chamber part may have an area increased from the rotation shaft toward a radial outer side.

The chamber parts may be symmetrical to each other with respect to the rotation shaft.

The cooling air supply passage may extend through a region in which the chamber part is not formed.

The cooling air supply passage may extend toward the turbine disk unit along an axial direction of the torque tube unit.

The cooling air supply passages may be disposed along a circumferential direction of the torque tube unit in the state in which the cooling air supply passages are spaced apart from each other at a predetermined interval and have a number corresponding to the number of turbine disks mounted in the turbine disk.

The cooling air supply passages may be formed to have the same diameter.

The first to n-th unit torque tubes of the torque tube unit may include an inclined part extending to be inclined toward an inner side of the body at a front surface and a rear surface of the body looking at the compressor disk unit and an extending part extending toward the rotation shaft of the gas turbine at a low end of the inclined part.

The first to n-th unit torque tubes may include extensions having a relatively larger diameter than the cooling air supply passage provided the front and rear surfaces of the body provided with the cooling air supply passages.

The compressor disk cooling passage may communicate with an upper portion of the extension and the cooling air supply passage may communicate with any one of a center of the extension and a lower portion of the center thereof.

An auxiliary cooling passage through which the cooling air flows may be formed between the extending part and the rotation shaft.

The auxiliary cooling passage may be formed to have a larger diameter than the cooling air supply passage and supply the cooling air to the turbine disk unit.

The turbine disk unit may further include an auxiliary chamber part providing a space through which cooling air is introduced between the turbine disks adhering to each other in a state in which the turbine disks face each other along an axial direction of the rotation shaft.

The auxiliary chamber part may be formed to have a smaller volume than the chamber part and include a first auxiliary passage extending at a predetermined diameter to supply the cooling air to the auxiliary chamber part.

The first auxiliary passage may extend to a middle of a radial length of the turbine disk.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
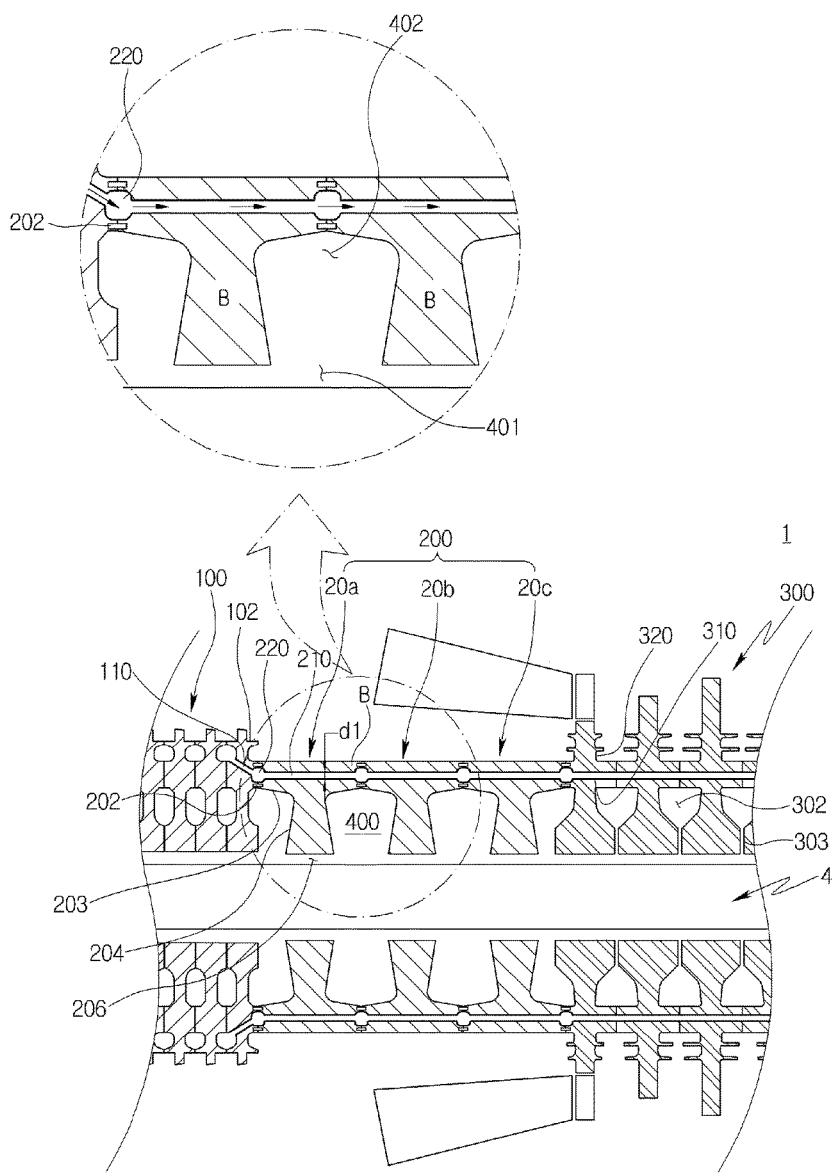
FIG. 1 is a longitudinal cross-sectional view of a cooling apparatus of a gas turbine according to an embodiment of the present disclosure.

A configuration of a cooling apparatus of a gas turbine according to one embodiment of the present disclosure will be described with reference to the accompanying drawings. FIG. 1 is a longitudinal cross-sectional view of a cooling apparatus of a gas turbine according to an embodiment of the present disclosure and FIG. 2 is an operation state diagram illustrating a state in which cooling air moves through the cooling apparatus of the gas turbine according to the embodiment of the present disclosure.

Figure 2:
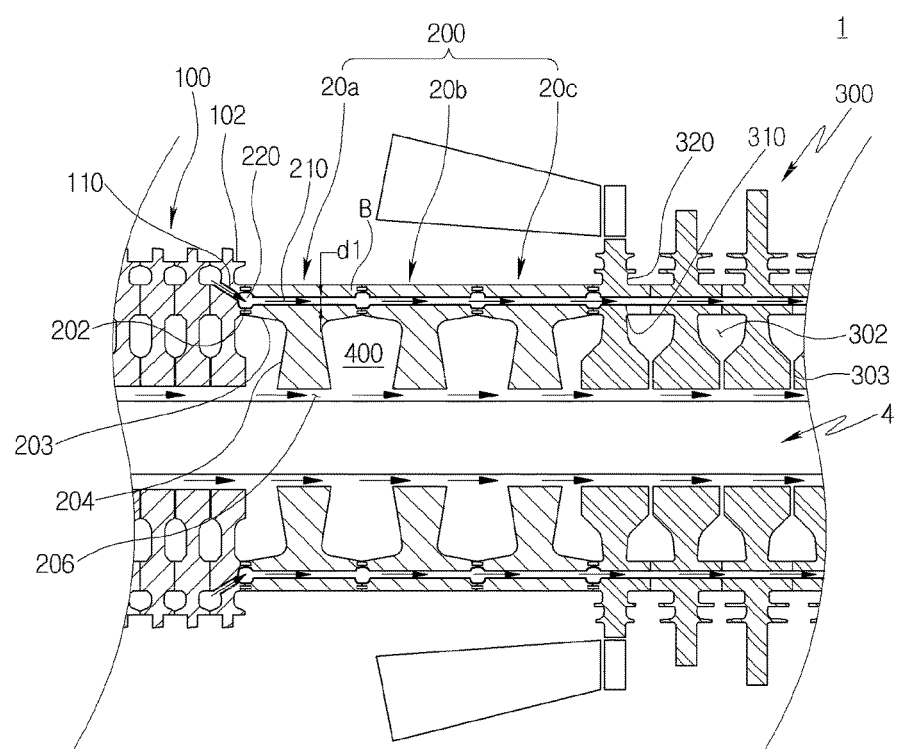
FIG. 2 is an operation state diagram illustrating a state in which cooling air moves through the cooling apparatus of the gas turbine according to the embodiment of the present disclosure.

Referring to FIGS. 1 and 2, a cooling apparatus 1 of a gas turbine according to an embodiment of the present disclosure is configured to include a compressor disk unit 100, a torque tube unit 200, and a turbine disk unit 300.

The compressor disk unit 100 is provided with a plurality of compressor disks 102 from the left in the drawings and the compressor disk cooling passage 110 is formed to be toward a circumferential inner side from a circumferential outer side. Further, the compressor disk unit 100 is disposed in the state illustrated in the drawings along an axial direction with respect to a rotation shaft 4 disposed at an axial center of the gas turbine.

In the compressor disk unit 100, the compressor disk cooling passage 110 extends at a slope inclined downwardly toward the torque tube unit 200 as illustrated in the drawings. The compressor disk cooling passage 110 extends to be inclined inwardly from the circumferential direction and communicates with an extension 220 to be described below, such that a fluid may stably flow.

The compressor disk cooling passage 110 may be provided with a spiral groove (not illustrated) along an inside axial direction. In this case, the fluid may move in a vortex shape, and thus the moving speed may be improved. Therefore, the fluid may be supplied to the torque tube unit 200 or the turbine disk unit 300 that need to be quickly cooled, thereby improving cooling efficiency.

When viewed from the front, the compressor disk unit 100 is disposed in a radial form with respect to the rotation shaft 4, and therefore the disk cooling passage 110 formed in the compressor disk unit 100 may communicate with the cooling air supply passage 210 of the torque tube unit 200 to be described below to make a fluid flow therebetween.

The disk cooling passage 110 is open as much as a diameter corresponding to the cooling air supply passage 210 and is supplied with high-pressure air supplied to the compressor and supplies the supplied air to the cooling air supply passage 210. Further, the compressor disk 102 positioned to be closest to the torque tube unit 200 is provided with the disk cooling passage 110.

The compressor disk unit 100 may rotate at a high speed by the rotation torque transferred from the turbine unit (not illustrated). For this purpose, an outer peripheral surface of the compressor disk unit 100 is provided with the compressor disk 102.

The plurality of torque tube units 200 are positioned in an adhering state to each other while being adjacent to the compressor disk unit 100 and is provided with the cooling air supply passage 210 communicating with the compressor disk cooling passage 110.

The torque tube unit 200 is disposed between the compressor disk unit 100 and the turbine disk unit 300 and includes first to n-th toque tube units 20a to 20c disposed in the axial direction of the rotation shaft 4.

The torque tube units 200 are coupled to each other in the adhering state to each other along the axial direction of the rotation shaft 4 installed in the gas turbine and the cooling air supply passage 210 is open in a horizontal direction along an axial direction from an edge of the torque tube unit 200.

When viewing the torque tube unit 200 from the front with respect to the axial direction of the rotation shaft 4, the plurality of cooling air supply passages 210 are disposed along the edge but the number of cooling air supply passages 210 is not specifically limited.

Further, the cooling air supply passage 210 is open in a horizontal direction toward the turbine disk unit 300 along the axial direction of the torque tube unit 200 and when the cooling air moves to the turbine disk unit 300, a layout may be simple and the cooling air may quickly move toward the turbine disk unit 300, which may contribute to the improvement in cooling efficiency.

When the first torque tube unit 20a is viewed from the side by being vertically cut based on the longitudinal cross-sectional view of the rotation shaft 4, the first torque tube unit 20a has a T-letter section shape at the radial outer side of the rotation shaft 4.

In this case, when the torque tube unit 200 rotates, a centrifugal force is increased to the circumferential outer side and thus the torque may be easily transferred to the turbine disk unit 300. As a result, the torque transfer efficiency of the torque tube unit 200 is increased.

Therefore, the turbine disk unit 300 is stably supplied with the torque simultaneously with stably supplied with the cooling air for cooling, thereby improving the cooling efficiency and the power transfer efficiency.

The first to n-th toque tube units 20a to 20c according to the embodiment of the present disclosure adhere to each other in the state in which they face each other along the axial direction of the rotation shaft 4 and further includes chamber parts 400 providing a space through which the cooling air is introduced between the first to n-th toque tube units 20a to 20c.

The chamber part 400 includes an inlet 401 into which the cooling air is introduced and an inner end portion 402 through which the cooling air supply passage 210 passes. The inlet 402 is formed to have an opened area smaller than the inner end portion 402 but is formed at a ratio illustrated in the drawings so that a large amount of cooling air is introduced into a region in the chamber part 400 without any particular resistance.

In particular, the chamber part 400 has an area increased toward the radial outer side from the rotation shaft 4 has an increased toward the cooling air supply passage 210. Therefore, it may contribute to significantly decrease the temperature of the compressed air passing through the first torque tube unit 20a.

The chamber part 400 is formed at each of the first to n-th toque tube units 20a to 20c that adhere to each other and the plurality of chamber parts are formed at a predetermined interval along the axial direction of the rotation shaft 4 based on the drawings. Further, the chamber parts 400 are symmetrical to each other with respect to the rotation shaft 4, and therefore may constantly supply the cooling air to the first to n-th toque tube units 20a to 20c, thereby uniformly supplying the cooling air.

In the chamber part 400 according to the embodiment of the present disclosure, the size of the chamber part 400 at a specific position may be formed to be large depending on temperature distribution states of the first to n-th toque tube units 20a to 20c. In this case, the chamber part 400 may be supplied with a large amount of cooling air, and thus the cooling efficiency may be increased.

The cooling air supply passage 210 is horizontally open with respect to the radial direction of the torque tube unit 200, in more detail, the chamber part 400 extends through the non-formed region.

The cooling air supply passage 210 passes through the first to n-th toque tube units 20a to 20c formed of a solid, such that the cooling air is independently supplied to the turbine disk unit 300 without being mixed with the cooling air introduced into the chamber part 400. In this case, the instable flow of the fluid due to the mixture does not occur and the fluid individually flows, and therefore the flow stability of fluid in the chamber part 400 and the flow stability of the compressed air moving through the cooling air supply passage 210 may be improved.

For example, the first torque tube unit 20a is formed in a T-letter form as described above and the cooling air supply passage 210 is formed at a horizontally extending portion in the portion formed in the T-letter form.

A front surface and a rear surface of the first torque tube unit 20a are formed flatly, and since the cooling supply air passages 210 on front and rear surfaces of a first unit torque tube 20a are horizontally open, a worker may more easily machine the cooling air supply passage 210, thereby improving the workability of the worker and improving the working speed.

If the position of the cooling air supply passage 210 extends along the path passing through the position of the chamber part 400, not passing through the position illustrated in the drawings, the phenomenon that the cooling air may diffused in the chamber part 400 may occur, and therefore the cooling air supply passage 210 is preferably formed at the foregoing position.

Further, when the cooling air supply passage is formed in the inclined direction or the rounded direction, not in the horizontal direction, the machining may be relatively difficult. As a result, the cooling air supply passage more preferably extends horizontally like the present disclosure.

All the first to n-th toque tube units 20a to 20c have the same shape. Here, the first torque tube unit 20a is described, and therefore the description of the rest second to n-th toque tube units 20a and 20c will be omitted.

The first torque tube unit 20a includes an inclined part 203 extending to be inclined toward an inner side of a body B after a front surface and a rear surface of a body B looking at the compressor disk unit 100 extend downwardly vertically as much as a predetermined length and an extending part 204 extending toward the rotation shaft 4 inserted into the gas turbine 1 from a lower end of the inclined part 203.

Referring to the drawings, a chamber part 400 formed in a clear space is formed between the first torque tube unit 20a and a second torque tube unit 20b adjacent thereto, and the cooling air supply air 210 straight extends toward the turbine disk unit 300 along the axial direction of the rotation shaft 4 from above the chamber part 400.

It is to be noted that the chamber 400 may have a shape illustrated in the drawings to improve the torque of the foregoing torque tube unit 200 or may be changed to other forms.

The cooling air supply passage 210 preferably penetrates straight to more easily perform a drilling operation when the drilling machining is performed on the torque tube unit 200, but may not extend straight as described above but extend along other paths.

The cooling air supply passage 210 is formed to have a first diameter dl, in which the first diameter dl is not particularly limited. Therefore, the cooling air supply passage 210 is open in consideration of a pressure of high-pressure air that is supplied through the compressor.

Further, the cooling air supply passage 210 according to the embodiment of the present disclosure is open at the same diameter in all the first to n-th torque tube units 20a to 20c. In this case, the drilling operation may be easily performed to improve the workability of a worker and reduce or prevent the phenomenon that the flow of cooling air is unstable due to the difference in diameter.

Further, when the cooling air supply passage 210 is configured to have the same diameter as described above, a flow rate of cooling air may be constant to improve the cooling efficiency of the turbine disk unit 300 corresponding to the final object to be cooled and reduce or minimize the unnecessary generation of friction.

Further, the cooling air supply passage 210 extends straight along the axial direction of the torque tube unit 200 and therefore does not extend to be bent or inclined at a sudden angle at a specific position, thereby stably guiding the flow of cooling air and may supply a large amount of cooling air toward the turbine disk unit 300 even when the length of the torque tube unit 200 is long, thereby stably cooling the turbine disk unit 300.

The first to n-th toque tube units 20a to 20c are provided with a connection member 220 to be maintained in the adhering state to each other at the front and rear positions, and thus are coupled with each other in the adhering state to each other.

By configuring the torque tube unit 200 according to the embodiment of the present disclosure in plural, when the torque tube 200 at a specific position is out of order or needs to be repaired during the long-term operation of the gas turbine 1, the whole of the torque tube unit 200 need not be replaced and only the first torque tube unit 20a or the second torque tube unit 20c to be repaired is enough to be replaced, thereby shortening the repair or check time. By doing so, the working efficiency of the worker is increased and the utilization of the gas turbine is improved by the quick replacement.

The first to n-th toque tube units 20a to 20c may be maintained in the state in which they are assembled with each other by the foregoing connection member 202 or may be separated from each other and may serve as a medium that may be configured of the individual configuration assembly, not the single configuration.

The connection member 202 is not particularly defined as a specific configuration. However, the torque tube units may be coupled with each other by the Hirth coupling or other schemes to be fixed to each other.

In the first to n-th toque tube units 20a to 20c of the torque tube unit 200, front and rear surface of a body B at the position where the cooling air supply passage 210 is formed are provided with the extensions 220 having a relatively larger diameter than that cooling air supply passage 210.

The extension 220 provides a predetermined clearance to stably move the cooling air through the cooling air supply passage 210 even when the cooling air supply passages 210 do not accurately match each other when the first to n-th unit torque tubes 201 to 203 are assembled with each other by the connection member 202 in the state in which they adhere to each other, thereby improving the supply stability of a large amount of cooling air.

For example, when the worker assembles the first to n-th toque tube units 20a to 20n to each other, even when the cooling air supply passages 210 do not accurately match each other, the cooling air supply passage accurately formed in the first torque tube unit 20a and the cooling air supply passage formed in the second torque tube unit 20b may be accurately assembled within the predetermined range by the extension 220 in the state in which they communicate with each other.

Therefore, even when the assembling error finely occurs on the spot where the first to n-th toque tube units 20a to 20c are assembled, the cooling air may be stably supplied to the turbine disk unit 300 through the cooling air supply passage 210.

The plurality of cooling air supply passages 210 are disposed along a circumferential direction of the torque tube unit 200 in the state in which they are spaced apart from each other at a predetermined interval. Here, the number of cooling air supply passages 210 corresponds to the number of turbine disks 320 mounted on the turbine disk unit 300.

For example, when the number of turbine disks 320 is n, the number of cooling air supply passages 210 is n corresponding to the turbine disk 320.

Therefore, the cooling air may be individually supplied to each of the turbine disks 320, thereby improving the durability of the turbine disk 320 and stably protecting the surface thereof by the stable cooling, regardless of the position where it is exposed to the high temperature condition and the environmental characteristics. Further, it is possible to reduce or prevent the problems due to cracks or breakage even when the turbine disk 320 is used for a long time.

Further, by doing so, the continuous operation may be performed without replacing the expensive turbine disk unit 300 and stopping the gas turbine.

The compressor disk cooling passage 110 according to the embodiment of the present disclosure communicates with the upper portion of the extension 220 and the cooling air supply passage 210 communicates with any one of a center of the extension 220 and a lower portion of the center of the extension 220. The extension 220 is introduced with a large amount of cooling air and has a layout illustrated in the drawings to stably move the cooling air since the connection position to the cooling air supply passage 210 is different in the compressor disk cooling passage 110.

If the cooling air is supplied to the extension 220 through the compressor disk cooling passage 110, the cooling air moves to the cooling air supply passage 210 as illustrated by an arrow.

To move the cooling air between the extending part 204 and the rotation shaft 4, an auxiliary cooling passage 206 is formed, in which the auxiliary cooling passage 206 has a gap formed at an outside of the rotation shaft 4 at a predetermined interval to supply the cooling air in an arrow direction, thereby stably moving the high-pressure cooling air.

The cooling air moving through the auxiliary cooling passage 206 moves toward the turbine disk unit 300 along the rotation shaft 4 as illustrated by an arrow. The cooling air moves through the center of the turbine disk 320 and the cooling air supplied through the auxiliary cooling passage 206 may promote the cooling at the lower portion of the turbine disk 320, thereby stably promoting the whole cooling of the turbine disk 320.

The auxiliary cooling passage 206 may have a larger diameter than the cooling air supply passage 210 to supply a large amount of cooling air to the turbine disk unit 300 along the rotation shaft 4, such that when the turbine disk configuring the turbine disk unit 300 is plural, it may more stably and effectively perform cooling along with the cooling air supply passage 210.

Therefore, even when the turbine disk unit 300 mounted in the gas turbine is exposed for a long time under the high temperature condition, the problems such as the occurrence of cracks on the surface or the reduction in durability may be reduced or minimized.

The turbine disk unit 300 is provided with the turbine disk cooling passage 310 communicating with the cooling air supply passage 210 of the torque tube unit 200, in which the turbine disk cooling passage 310 penetrates through the rear surface of the turbine disk 320 from the front surface thereof.

The turbine disk cooling passage 310 may be configured to have the same diameter as the cooling air supply passage 210 or may be configured to have the diameter reduced in the moving direction of the cooling air.

In the torque tube unit 200 according to the embodiment of the present disclosure, a gasket (not illustrated) for sealing may be installed between the first to n-th toque tube units 20a to 20c to prevent the cooling air supplied through the cooling air supply passage 210 from being leaked. For reference, the gasket has an O ring shape.

The gasket is mounted in a region other than the extension 220 in the adhering surface on which the first torque tube unit 20a and the second torque tube unit 20b adheres to each other.

The turbine disk unit 300 according to the embodiment of the present disclosure is further provided with the auxiliary chamber part 302 that provides a space through which the cooling air is introduced between the turbine disks adhering to each other in the state in which the turbine disks face each other along the axial direction of the rotation shaft 4.

The auxiliary chamber part 302 has a smaller volume than the chamber part 400 and is provided with a first auxiliary passage 303 extending to a predetermined diameter to supply the cooling air to the auxiliary chamber part 302.

The auxiliary chamber part 302 is formed to cool the turbine disk unit 300 and is introduced with the cooling air through the first auxiliary passage 303 unlike the foregoing chamber part 400.

The first auxiliary passage 303 is not limited to the diameter illustrated in the drawings and the number of first auxiliary passages 303 may be increased.

The first auxiliary passage 303 guides the supply of cooling air to the auxiliary chamber part 302 and is formed to have a small diameter to prevent the cooling air supplied to the auxiliary chamber part 302 from reflowing through the first auxiliary passage 303, in which the extending length also extends to the length in illustrated in the drawings.

Therefore, when the cooling air is supplied to the auxiliary chamber part 302 through the first auxiliary passage 303, the cooling air may stably perform cooling on the turbine disk unit 300 while staying for a predetermined time, thereby improving the cooling efficiency.

The first auxiliary passage 303 according to the embodiment of the present invention extends to the middle of the radial length of the turbine disk. As the length extends long, the cooling air supplied to the auxiliary chamber part 302 may stay in the auxiliary chamber part 302 for a predetermined time without reflowing to the first auxiliary passage 303.

As illustrated in the drawings, the auxiliary chamber part 302 may be formed at the same size or different sizes. For example, the size of the auxiliary chamber part 302 is formed to be large and the diameter of the first auxiliary passage 300 may be increased, in response to the temperature distribution depending on the position of the turbine disk unit 300 when the high temperature is maintained.

In this case, a large amount of cooling air may be supplied to the auxiliary chamber part 302 through the first auxiliary passage 300, thereby improving the cooling efficiency.

The first auxiliary passage 303 may have the diameter reduced toward the right of the turbine disk unit 300 based on the drawings and the number of first auxiliary passages 303 communicating with the auxiliary chamber part 302 may be changed.

For example, in the turbine disk unit 300 maintained at a high temperature, the diameter of the first auxiliary passage 303 is formed to be large or the opened number thereof may be plural.

Further, the auxiliary chamber part 302 formed at a position where a relatively lower temperature is maintained may be provided with one first auxiliary passage 303.

A cooling apparatus of a gas turbine according to another exemplary embodiment of the present disclosure will be described with reference to the accompanying drawings. For reference, the description of the components (compressor disk unit, turbine disk unit, turbine disk) already described in FIG. 1 will be omitted.

Figure 3:
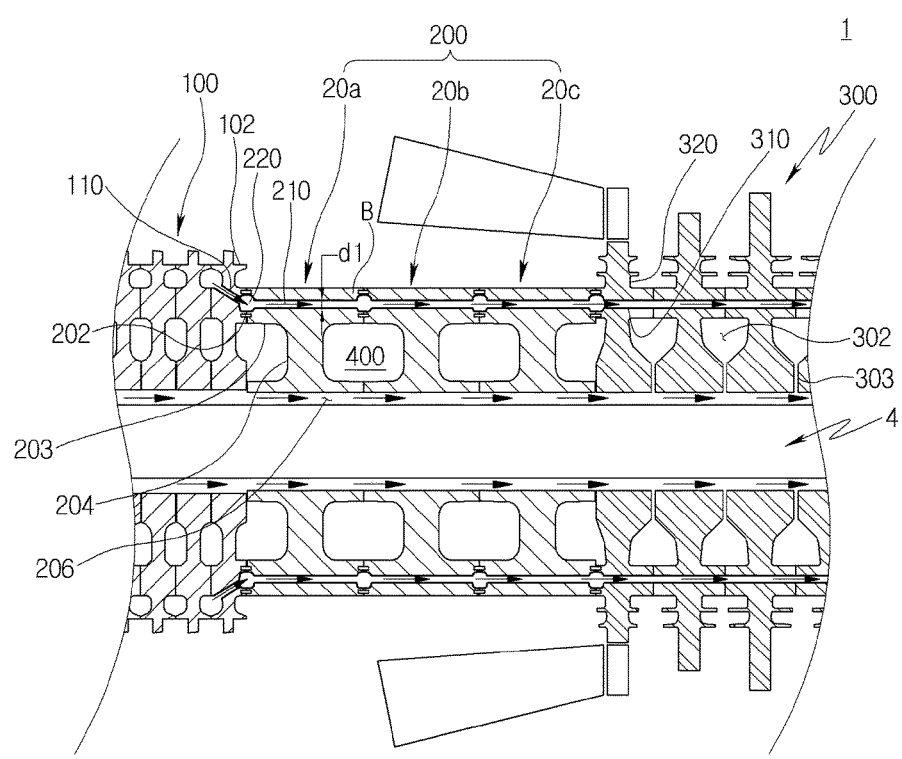
FIG. 3 is a longitudinal cross-sectional view of a cooling apparatus of a gas turbine according to anther embodiment of the present disclosure.

Referring to FIG. 3, the embodiment of the present disclosure is changed from the embodiment illustrated in FIG. 1 as described above and the cross section shape of the torque tube unit 200 has an I-letter shape, not a T-letter shape. For reference, according to the embodiment of the present disclosure, the position and shape of the cooling air supply passage 210 are the same as the structure of FIG. 1 described above, and therefore the detailed description thereof will be omitted.

When the torque tube unit 200 has the I-letter shape, the phenomenon that the cooling air supplied and moving to the chamber part 400 may be suppressed significantly and the cooling air may be supplied only for cooling the plurality of turbine disks 320 disposed in the turbine disk unit 300 to improve the cooling efficiency of the turbine disk 300 exposed to the high-temperature environment and suppress the phenomena such as the material deformation and the cracks of the surface, thereby stably operating the gas turbine.

The chamber part 400 is formed differently from the form illustrated in FIG. 1 as described above and the cooling air may be partially supplied or may not be supplied to the chamber part 400 along the longitudinal length of the lower portion of the I-letter shape.

In this case, the chamber part 400 may be selectively introduced with cooling air of a specific flow rate and the opened area thereof may be differently configured by each position of the first to n-th toque tube units 20a to 20c. In this case, the higher the temperature, the larger the opened area, and the lower the temperature, the smaller the opened area.

Therefore, the cooling air volume introduced into the chamber part 400 may be selectively adjusted and therefore the flow rate to be supplied to the turbine disk 320 may be adjusted to the optimal state, thereby improving the design freedom for cooling.

For example, to supply the cooling air to the chamber part 400, a predetermined amount of cooling air may be supplied to the chamber part 400 when the length of the lower portion thereof based on the cross section of the torque tube unit 200 is short, and therefore a designer may freely perform a change in design depending on the capacity of the gas turbine or the cooling air volume under the optimal condition.

Figure 4:
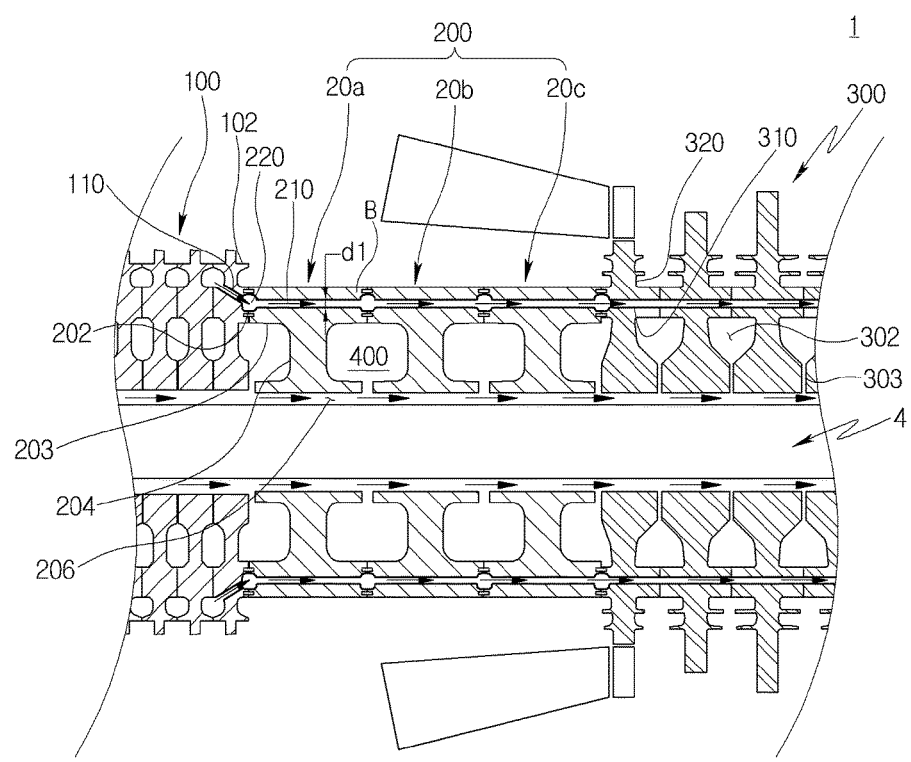
FIG. 4 is a longitudinal cross-sectional view of a cooling apparatus of a gas turbine according to another embodiment of the present disclosure.

Referring to FIG. 4, the chamber part 400 may be partially open toward the rotation shaft 4 based on the drawings to introduce the cooling air. The opened area is not particularly limited but is changed depending on the temperature distribution state of the first to n-th toque tube units 20a to 20c.

Further, the opened number may also be increased to a plural number and it may be opened to be inclined toward the chamber part 400.

According to the embodiments of the present disclosure, the cooling air may be stably supplied to the turbine disk unit in which the high temperature condition is continuously maintained, thereby reducing or minimizing the expensive turbine disk unit from being damaged and deformed due to the thermal deformation.

According to the embodiments of the present disclosure, the torque tube unit may be separated into the plurality of unit torque tubes to be easily assembled and disassembled and thus a worker may easily perform the disassembling and assembling when the torque tube unit needs to be repaired and inspected, thereby improving the workability of the worker and shortening the working time to effectively check and repair the gas turbine.

According to the embodiments of the present disclosure, the cooling air supply passage is open toward the passage extending straight so that the cooling air supply passage formed in the torque tube unit may be easily machined, thereby facilitating the machining and improving the workability.

Those skilled in the art will appreciate that since various modifications and alterations may be made without departing from the spirit of the present disclosure, the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A cooling apparatus of a gas turbine, comprising: a compressor disk unit configured to be mounted in a gas turbine and provided with a compressor disk cooling passage for flowing a cooling air; a plurality of torque tube units disposed adjacent the compressor disk unit, and the torque tube units configured to couple to each other, wherein each of the torque tube units defines a hole to form a cooling air supply passage that communicates with the compressor disk cooling passage such that the cooling air flown from the compressor disk cooling passage is flown to reach to the cooling air supply passage; and a turbine disk unit including a turbine disk cooling passage configured to communicate with the cooling air supply passage of the torque tube units such that the cooling air flown from the cooling air supply passage is flown to reach to the turbine disk cooling passage, wherein the torque tube units are disposed between the compressor disk unit and the turbine disk unit along an axial direction of a rotation shaft mounted in the gas turbine, the torque tube units are coupled to the compressor disk unit and the turbine disk unit, and the cooling air supply passage is configured to pass through each of the torque tube units, and formed separately above chamber parts and in a horizontal direction along the axial direction from an edge of the torque tube units.

2. The cooling apparatus of claim 1, wherein the torque tube units include first to n-th torque tube units that are disposed between the compressor disk unit and the turbine disk unit, and
the first to n-th torque tubes coupled by a connection member that couples a front surface of one torque tube and a rear surface of an adjacent torque tube.

3. The cooling apparatus of claim 2, wherein the first to n-th torque tube units each have a T-letter cross-sectional shape toward a radial outer side with respect to the rotation shaft when viewed from a side by being cut in a longitudinal direction based on the rotation shaft.

4. The cooling apparatus of claim 2, wherein
the first to n-th torque tube units are arranged such that the first to n-th torque tube units face each other along the axial direction of the rotation shaft, and
the first to n-th torque tube units include the chamber parts that provide a space operable to pass cooling air.

5. The cooling apparatus of claim 4, wherein an area of at least one of the chamber parts increases from the rotation shaft toward an outer radial side.

6. The cooling apparatus of claim 4, wherein the chamber parts are symmetrical to each other with respect to the rotation shaft.

7. The cooling apparatus of claim 1, wherein the cooling air supply passage extends through a region in which the chamber part is not formed.

8. The cooling apparatus of claim 1, wherein the cooling air supply passages extend toward the turbine disk unit along an axial direction of the torque tube units.

9. The cooling apparatus of claim 1, wherein two or more other cooling air supply passages, each of which is formed in a same manner for forming the cooling air supply passage, are further formed to pass through the torque tube units, and respectively disposed along a circumferential direction of each of the torque tube units, and
the two or more other cooling air supply passages are spaced apart from each other at a predetermined interval, and
a number of the torque tube units corresponds to a number of turbine disks mounted in the turbine disk unit.

10. The cooling apparatus of claim 1, wherein all of cooling air supply passage and the two or more other cooling air supply passages have a same diameter.

11. The cooling apparatus of claim 2, wherein
the first to n-th torque tube units each include an inclined part that inclines toward an inner side of the torque tube at a front surface and a rear surface of the torque tube, and
the first to n-th torque tube units each include an extending part that extends toward the rotation shaft of the gas turbine at a low end of the inclined part.

12. The cooling apparatus of claim 11, wherein the first to n-th torque tube units each include an extension having a diameter at the front and rear surfaces of each torque tube that is larger than a diameter of the cooling air supply passage.

13. The cooling apparatus of claim 12, wherein
the compressor disk cooling passages communicate with an upper portion of the extension, and
the cooling air supply passage and the two or more other cooling air supply passages respectively communicate with any one of a center of the extension and a lower portion of the extension.

14. The cooling apparatus of claim 11, further comprising an auxiliary cooling passage formed between the extending part and the rotation shaft configured to pass a cooling air.

15. The cooling apparatus of claim 14, wherein the auxiliary cooling passage has a larger diameter than the diameter of the cooling air supply passage and is configured to supply the cooling air to the turbine disk unit.

16. The cooling apparatus of claim 2, wherein the turbine disk unit includes an auxiliary chamber part that provides space through which cooling air is introduced between adjacent turbine disks along an axial direction of the rotation shaft.

17. The cooling apparatus of claim 16, wherein the auxiliary chamber part has a smaller volume than the chamber part and includes a first auxiliary passage configured to supply a cooling air to the auxiliary chamber part.

18. The cooling apparatus of claim 17, wherein the first auxiliary passage extends to a middle of a radial length of the turbine disk.

* * * * *